(12) United States Patent
Wender

(10) Patent No.: US 7,930,227 B2
(45) Date of Patent: Apr. 19, 2011

(54) METHOD OF EVALUATING AN OPTION SPREAD

(76) Inventor: David Wender, New York, NY (US)

( * ) Notice: Subject to any disclaimer, the term of this patent is extended or adjusted under 35 U.S.C. 154(b) by 1285 days.

(21) Appl. No.: 10/788,506

(22) Filed: Feb. 26, 2004

(65) Prior Publication Data

US 2005/0192886 A1 Sep. 1, 2005

(51) Int. Cl.
*G06Q 40/00* (2006.01)
(52) U.S. Cl. ........................................ 705/35; 705/37
(58) Field of Classification Search .................. 705/35, 705/37
See application file for complete search history.

(56) References Cited

U.S. PATENT DOCUMENTS

| | | | |
|---|---|---|---|
| 6,766,304 B2 | 7/2004 | Kemp, II et al. | |
| 6,772,132 B1 | 8/2004 | Kemp, II et al. | |
| 7,225,153 B2 * | 5/2007 | Lange ............................. | 705/37 |
| 2002/0128952 A1 * | 9/2002 | Melkomian et al. ............ | 705/37 |
| 2002/0147670 A1 * | 10/2002 | Lange ............................. | 705/35 |

OTHER PUBLICATIONS

Yu Chuan Huang. (2004). The Components of Bid-Ask Spread and Their Determinants: TAIFEX Versus SGX-DT. The Journal of Futures Markets, 24(9), 835-860. Retrieved Nov. 2, 2010, from ABI/INFORM Global. (Document ID: 679245951).*

Estrella, Arturo, Hendricks, Darryll, Kambhu, John, Shin, Soo, & Walter, Stefan. (Jul. 1994). The price risk of options positions: Measurement and capital requirements. Federal Reserve Bank of New York Quarterly Review, 19(2), 27. Retrieved Nov. 2, 2010, from ABI/INFORM Global. (Document ID: 17388).*
John Kambhu, & Patricia C Mosser. (Dec. 2001). The effect of interest rate options hedging on term-structure dynamics. Economic Policy Review—Federal Reserve Bank of New York, 7(3), 51-70. Retrieved Nov. 2, 2010, from ABI/INFORM Global. (Document ID: 103491570).*
John E Kambhu. (Jun. 1998). Dealers' hedging of interest rate options in the U.S. dollar fixed-income market. Economic Policy Review—Federal Reserve Bank of New York, 4(2), 35-57. Retrieved Nov. 2, 2010, from ABI/INFORM Global. (Document ID: 32106268).*
FORRELEASE.COM, Know Now, Accius and WhenTech Team to Deliver Wireless, Real-Time Trading Solution, http://ww.forrelease.comD20031113/sfth065.P2.11132003131927.08072.html Published on Nov. 13, 2003; Printed on Jan. 23, 2004.

* cited by examiner

*Primary Examiner* — Alexander Kalinowski
*Assistant Examiner* — Muriel Tinkler
(74) *Attorney, Agent, or Firm* — Scott Kolassa; Joseph D. Eng, Jr.; King & Spalding LLP

(57) ABSTRACT

The invention relates to a method for determining a type of option spread based upon options received from an input device. The method comprises receiving a sequence of options, comparing each option with each other option, assigning a quantity for each option, and determining a type of option spread based upon the comparison of each option with each other option and the assigned quantity of each option.

65 Claims, 11 Drawing Sheets

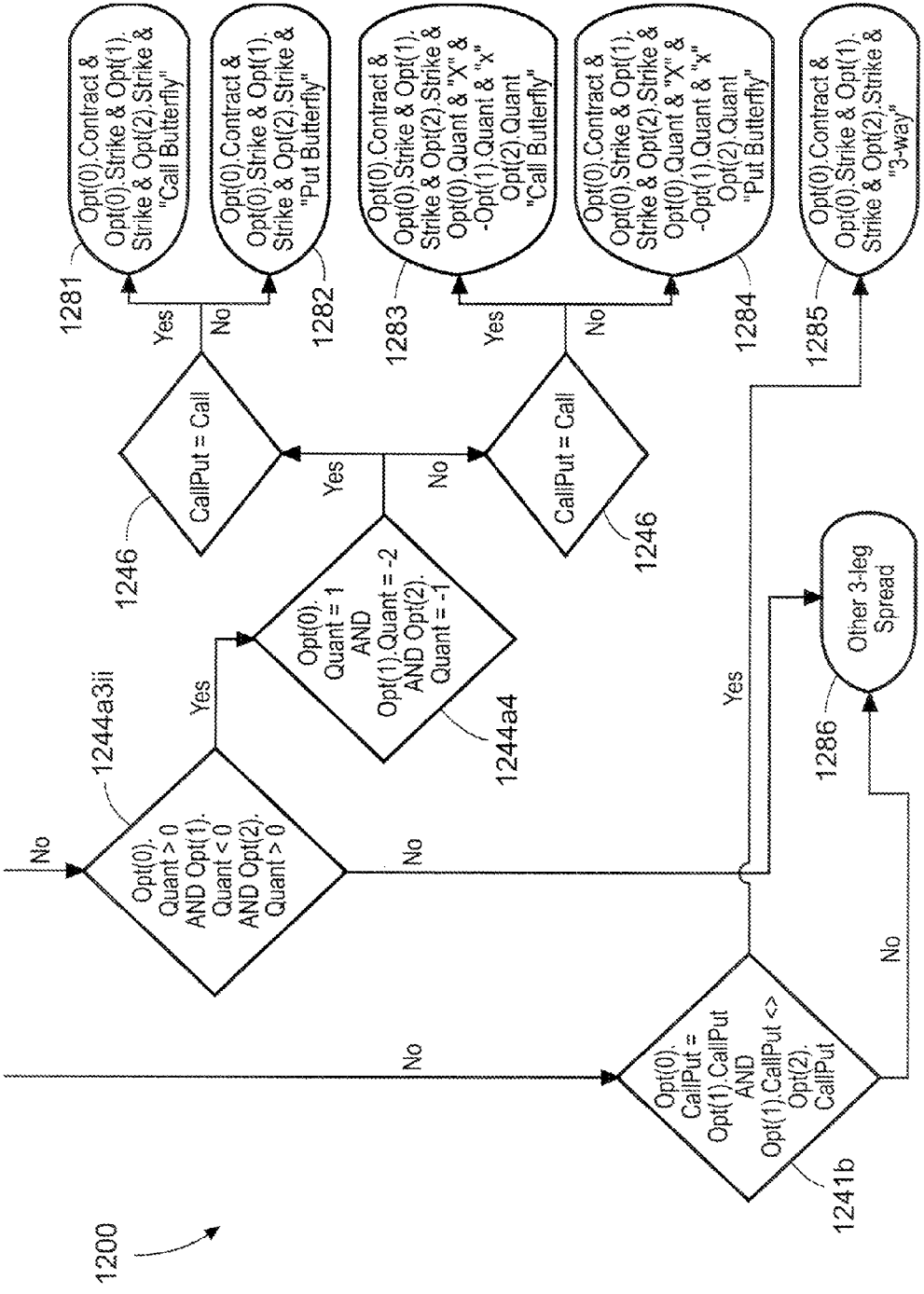

FIG. 13

METHOD OF EVALUATING AN OPTION SPREAD

BACKGROUND OF THE INVENTION

1. Field of the Invention

The invention relates generally to the evaluation of an option spread based upon a sequence of options received from an input device, and relates particularly to the determination of a type of option spread based upon a comparison of each option in the sequence of options with each other option in the sequence and the quantity assigned to each option.

2. Description of the Related Art

The term "option spread" is defined as a concurrent purchase and/or sale of multiple options.

The term "option" is defined as a single option contract. Each option has several properties, such as an optioncode, a contract, a strike, a callput, and a quantity, which will be defined below. Whenever two options share an optioncode, a contract, a strike, and a callput, the two options are the same. Each option has a defined structure as determined by the Exchange rules on which the option trades. The Exchange rules specify exercise style, such as American or European, expiration date, the underlying instrument that the option exercises into, and available strike prices.

An "optioncode" designates the option contract. For options on the futures, physical commodities, and swaps an optioncode is generally a two letter code designated by the Exchange on which the option trades. By way of explanation, "LO" designates New York Mercantile Exchange ("NYMex") options on the price of NYMex Light Sweet Crude Oil futures, while "AO" designates NYMex options on the average price of NYMex Sweet Crude Oil futures.

A "contract" designates the exercise date for the option. Generally, options are listed by contract month and year. By way of explanation, "Z04" for an "LO" option refers to a December 2004 for a NYMex Light Sweet Crude Oil futures option. Technically speaking, a "Z04" option expires three days prior to the December Crude Oil futures last trading day in November of 2004. The following description lists the generally accepted month codes: "F" January, "G" February, "H" March, "J" April, "K" May, "M" June, "N" July, "Q" August, "U" September, "V" October, "X" November, and "Z", as discussed herein above, December.

A "strike" designates the price at which the holder of an option may exercise the right to buy or sell the underlying asset. Generally, a trader packages an option spread with a single strike. The price differentials between the options determines the strike.

A "callput" designates whether the option is a "call option" or alternatively, a "put option." The holder of a call option may, but is not obligated to, purchase the underlying asset at a designated strike of the option. The holder of a put option may, but is not obligated to, sell the underlying asset at a designated strike of the option.

"Quantity" designates the number of options to purchase, if the quantity is a positive number, or the number of options to sell, if the quantity is a negative number.

A description of the purchase of a single $38.00 crude oil call option (value=$1.20) follows. If a trader predicts that in the next three months the price of crude oil will increase, the trader purchases a $38.00 call option on crude oil at a strike of $1.20 (expiration date: three months). The standard crude oil option is for 1000 barrels, accordingly such option would cost $1.20/bbl*1000 bbls or $1,200. With this $38.00 option, the holder may purchase crude oil at $38.00 per barrel within the next three months no matter the market fluctuation in the price for crude oil. If the per barrel price of crude oil becomes more expensive, the holder profits. If the per barrel price of crude oil becomes less expensive, the $38.00 call option expires worthless. The buyer may not want to risk $1,200. If the buyer does not want to risk $1,200, instead the buyer may simultaneously buy and sell multiple call options for a lower monetary risk.

A description of the concurrent purchase of $38.00 call option (value=$1.20) and sell of a $42.00 call option (value=$0.65) follows. If the holder of a $4200 call option sells the $42.00 call option, while simultaneously purchasing a $38.00 call option, the user pays ($1.20−$0.65) or $0.55/bbl*1000 bbls equivalent to $550. However, in so doing, the holder of the $42.00 call option loses the potential profit if the price of oil exceeds $42.00 per barrel sometime in the next three months. This transaction is known as an "option spread." Because this particular option spread pertains to the purchase and sell of a "call" spread, this particular option spread in known, more particularly, as a "call spread." A description of various option spread names follows herein below.

It is typically much cheaper to trade options as a spread rather than purchasing options as outright trades. An outright trade would be the purchase of the $38.00 call option followed by the sale of the $42.00 call option. The first reason that spreads are cheaper than outright trades is that the trader does not have to give up the sale/purchase spread on each portion or in other words "leg" of the spread. In the previous example, the value of the $38.00 call option may have been $1.20, but the sale/purchase price may have been $1.16/$1.24. Likewise, the value of the $42.00 call option may have been $0.65, but the sale/purchase price may have been $0.62/$0.68. Purchasing the $38 call option for $1.24 and selling the $42 call option for $0.62 results in a total purchase price of ($1.24−$0.62) or $0.62//bbl*1000 bbls or $620. On the other hand, the spread value was ($1.20−$0.65) or $0.55 and may have been quoted as $0.53/$0.58. The user therefore could buy the spread for 0.58/bbl*1000 bbls, which is equivalent to $580, instead of $620, the price of an outright trade. Typically, spreads are quoted with tighter bid/ask prices due to the reduced risk involved in trading a spread.

In addition, the purchase of a spread rather than the purchase of options outright insulates the holder from risk. For example, a trader may purchase the $42 call option for $0.68/bbl*1000/bbl or $680 and sell the $38.00/$42.00 option spread at $0.53/bbl*1000/bbl or $530. But if the underlying price of crude oil fails at some point in time between the purchase of the $42 call option and the sale of the $38.99/$42.00 spread, the purchase price of the $38.00/$42.00 option spread will drop as well. Therefore, the holder will be forced to sell the $42.00 call option at an even lower bid price.

The ability of a trader to quickly and accurately determine the type of option spread trade and the price of an option spread is critical. In the past, traders required a physical paper trail to determine the option trade name and calculate the price. In addition in the past, traders would carry physical records of trade histories in order to maintain a record of information associated with a particular trade.

Until now, traders would print large numbers of pricing sheets to cover various pricing scenarios for the many listed options. As market conditions changed during the day, traders would print hundreds of pages to try to keep their prices and risk valuations accurate. Calculating an option spread meant looking at the prices of each option on these pieces of paper and doing the math in one's head or with a calculator. Such process often was marked by fairly high rates of error. As option spreads became more complicated, such as with three and four legged spreads, and markets started moving more unpredictably, these methods have become a hindrance to fast and accurate options market-making.

What is need is a real-time solution that quickly and accurately determines not only the type of option spread, but also its price, and other important investment information such as the delta, gamma, vega, theta, and implied volatility of the individual options. The real-time solution must deliver up-to-the minute data to traders on the exchange floor, thereby enabling traders to make faster, more accurate trades as well as minimizing trading risk and ensuring accurate trading positions.

It should be noted that the references cited and discussed in the description of this invention are provided merely to clarify the description of the invention. The recitation and/or discussion of these references is not an admission that any such reference is "prior art" to the invention described herein. All references cited and discussed in this specification are incorporated herein by reference in their entirety and to the same extent as if each reference was individually incorporated by reference.

SUMMARY OF THE INVENTION

The invention is directed to a method for determining a type of an option spread based upon options received from an input device. The method comprises the step of determining a first previous option count. The method comprises the step of receiving a first option from an input device comprising an optioncode, a contract, a strike, and a callput. The method comprises the step of assigning a quantity for the first option. The method comprises the step of determining a second previous option count. The method comprises the step of receiving a second option from an input device comprising an optioncode, a contract, a strike, and a callput. The method comprises the step of comparing the second option to the first option. The method comprises the step of assigning a quantity for at least one of the first option and the second option based upon the comparison of the second option to the first option. The method comprises the step of determining a type of option spread based upon at least one of the first and second option counts, the comparison of the second option to the first option, and the assigned quantities of the first and second options.

The invention is directed to a method for determining a type of option spread based upon a sequence of options received from an input device. The method comprises the step of determining a previous option count. The method comprises the step of receiving a sequence of options from an input device. Each option comprising an optioncode, a contract, a strike, and a callput. The method comprises the step of comparing the optioncode, contract, strike, and callput of each option with the optioncode, contract, strike, and callput of each other option in the sequence. The method comprises the step of assigning a quantity for at least one option in the sequence of options based upon the comparison of each option with respect to each other option and the quantity of each option with respect to each other option. The method comprises the step of determining a type of option spread based upon the previous option count, comparison of each option with each other option, and the assigned quantity of each option.

The present invention is directed to a method for determining a type of option spread based upon a sequence of user selections received from an input device. The method comprises the step of displaying a set of grids on a display device. Each grid represents an optioncode and comprises a set of selectable options. The method comprises the step of receiving a sequence of user selections chosen from the set of selectable options. Each user selection comprises an optioncode, a contract, a strike, and a callput. The method comprises the step of comparing the optioncode, contract, strike, and callput of each user selection with each other user selection in the sequence. The method comprises the step of assigning a quantity for at least one user selection in the sequence of user selections based upon the comparison of each user selection with each other user selection and the assigned quantity of each user selection. The method comprises the step of determining a type of option spread based upon a previous option count, the comparison of each user selection with each other user selection, and the assigned quantity of each user selection.

The invention is directed to a method for determining a type of option spread based upon a sequence of user selections received from an input device. The method comprises the step of viewing a set of grids on a display device. Each grid representing a single optioncode and comprising a set of selectable boxes. The method comprises the step of selecting a sequence of boxes. Each selection in the sequence comprises on optioncode, a contract, a strike, and a callout. The method comprises the step of receiving for the selected sequence an option spread name, an option spread price, and at least one of a positive and negative sign for the option spread.

BRIEF DESCRIPTION OF THE ILLUSTRATIVE EMBODIMENTS

The foregoing and other features of the invention will be more readily apparent from the detailed description in drawings of illustrative embodiments of the invention wherein like reference numbers refer to similar elements throughout the several views and in which.

Figure 9:
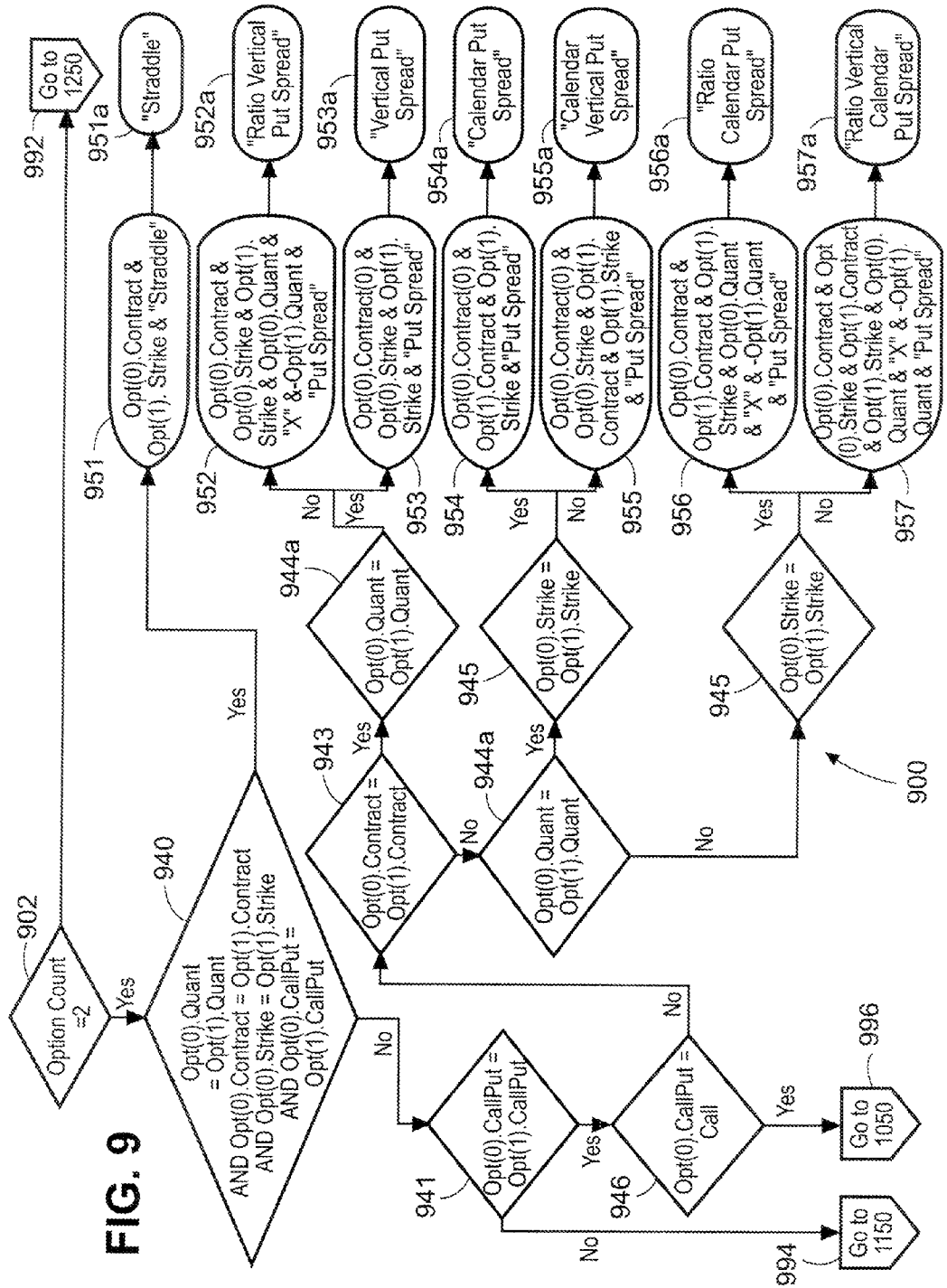
FIG. 9 is a system overview of the invention for a two legged option spread in accordance with the first and second illustrative embodiments.
Figure 10:
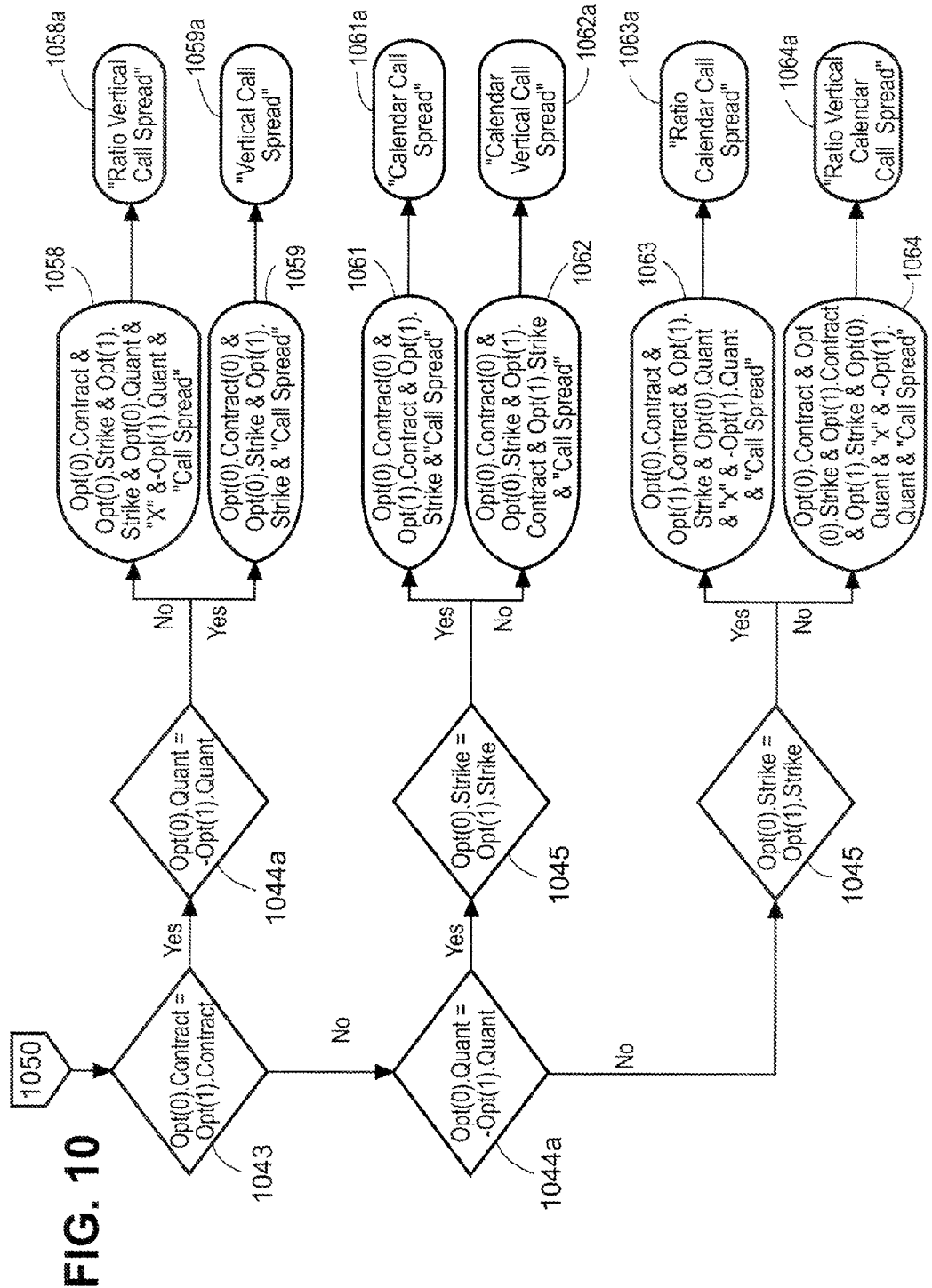
Figure 11:
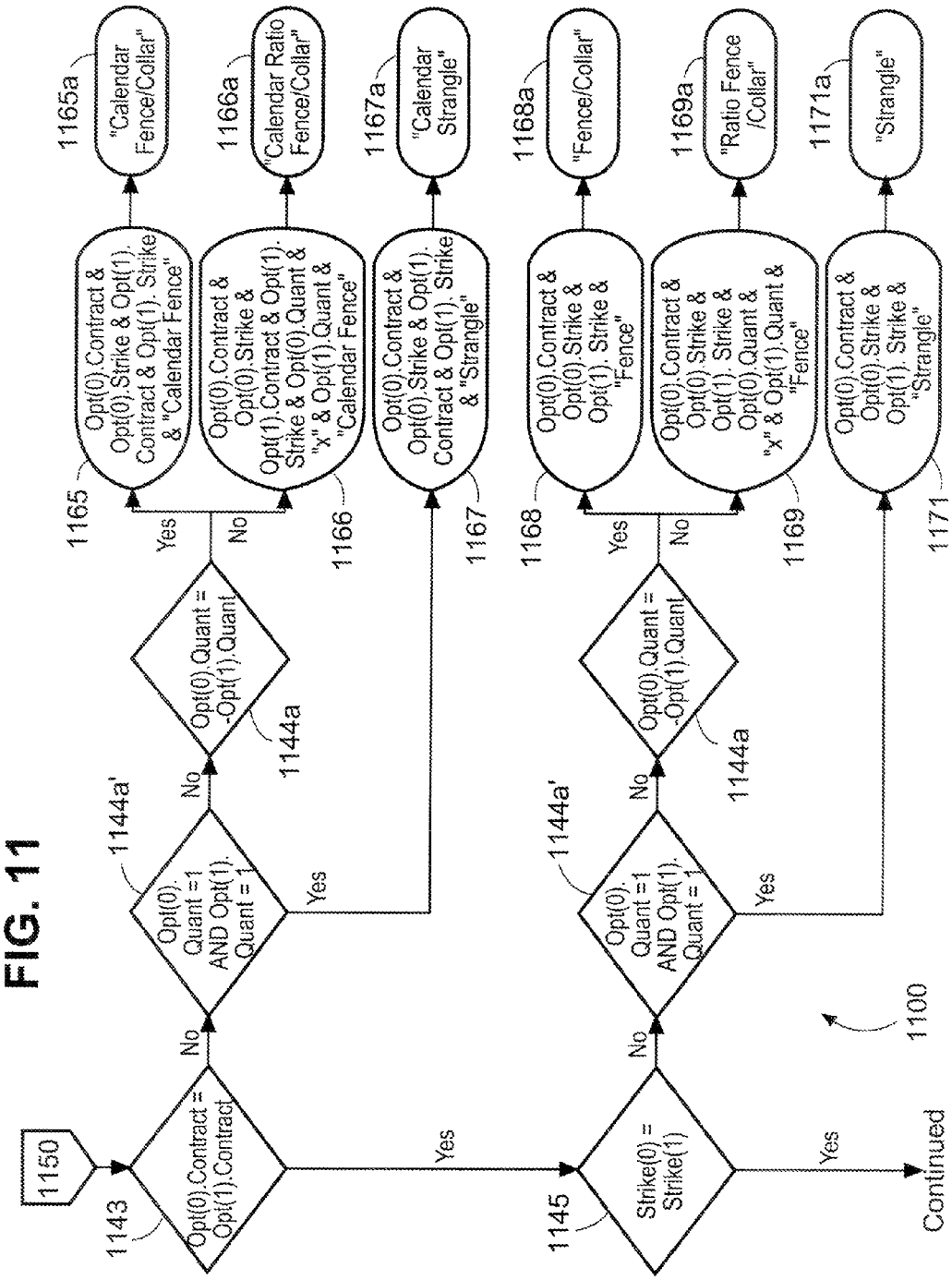
Figure 11:
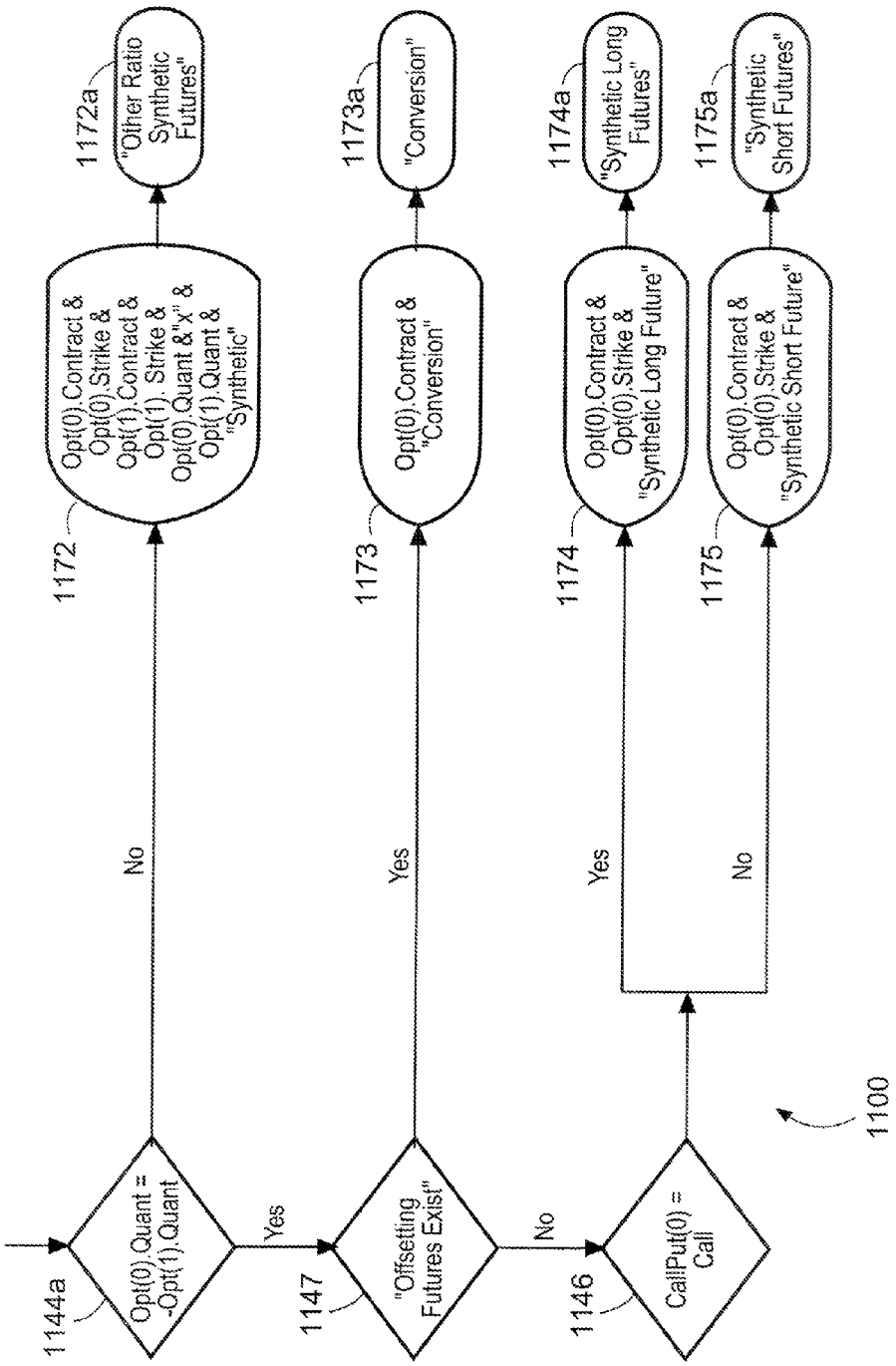
Figure 12:
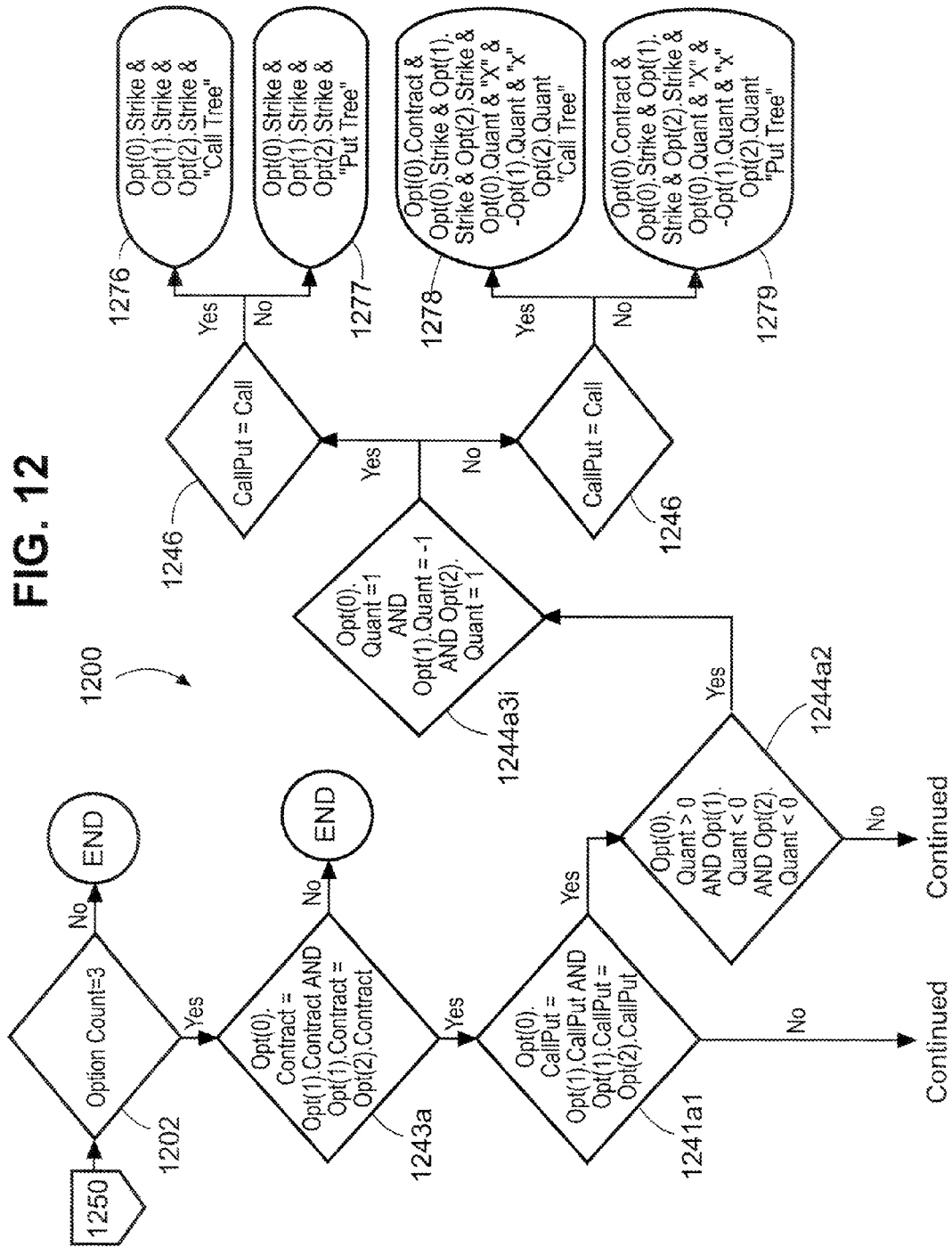

FIG. 10, stems from step 996 in FIG. 9, and is a further system overview of the invention for the two legged option spread in accordance with the first and second illustrative embodiments;

FIG. 11, stems from step 994 in FIG. 9, and is an additional system overview of the invention for the two legged option spread in accordance with the first and second illustrative embodiments;

FIG. 12, stems from step 992 in FIG. 9, and is a system overview of the invention for the three legged option spread in accordance with the first and second illustrative embodiments; and, FIG. 13 is a screen print in accordance with the first and second illustrative embodiments.

DETAILED DESCRIPTION OF THE ILLUSTRATIVE EMBODIMENTS

By way of overview and introduction, the illustrative embodiments of the invention depict an option spread determination and evaluation technique, which can be used by options, futures, and swaps traders on the exchange floor to make faster, more accurate trades with minimized risk. A trader, through the use of software stored on a computer, such as a wireless PC, a display device, such as a monitor, and an input device, such as a wireless mouse, a keyboard, a touch screen, a pointing pen, a stylus, and a tracking ball, views a set of grids and selects a sequence of boxes from those grids. Each grid represents an optioncode. Each grid comprises a set of selectable boxes. Each selected box represents an optioncode, a contract, a strike, and a callput. Once the trader selects the sequence of boxes, software stored in the computer determines the type of option spread. In addition, the software names the option spread, calculates the price of the option spread, and evaluates the risk associated with the option spread. Finally, the software sends the option spread name, price, and evaluated risk to the display device of the computer, which subsequently displays such information to the trader.

Some types of evaluated risk that the invention calculates in real-time includes the delta, gamma, vega, theta, and implied volatility. The delta indicates the price sensitivity to changes in price of an underlying asset for the option. Gamma indicates delta sensitivity to changes in price of an underlying asset for the option. Vega indicates price sensitivity to changes in expected volatility. Theta indicates price sensitivity to changes in time until expiration of the option. Implied volatility indicates a particular volatility derived from market price. The invention can calculate these values as an aggregate value or by subtotal according to underlying asset. Once calculated, the invention sends the evaluated risk values to the display device of the trader, thereby simplifying the trader's task of calculating the evaluated risk.

In short, the option spread determination technique of the invention provides an improved new method that more cost effectively, more efficiently, and more accurately determines the name of the option spread as well as the price and evaluated risk. The invention determines the option spread name, price, and evaluated risk in real time with accelerated processing time while eliminating the need for paper-based trade histories.

Figure 1:
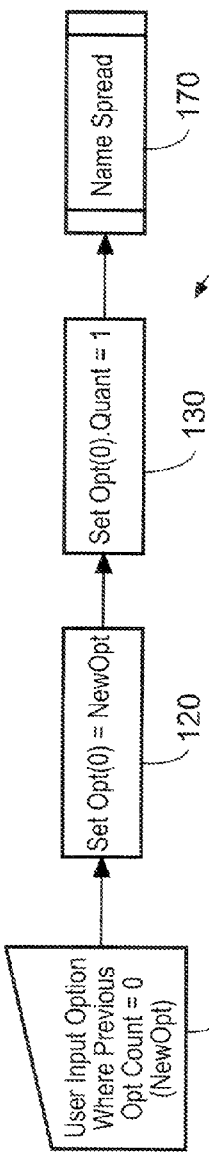
FIG. 1 is a system overview of the invention in accordance with a first illustrative embodiment.

FIG. 1 is a system overview of the invention in accordance with a first illustrative embodiment. In step 102, the user inputs a first option using an input device. As shown in step 102, the first option receives an option count of zero (0). In step 102, the invention recognizes the first option as a new option because the previous option count equals zero (0). Once the invention recognizes, in step 102, that the previous option count equals zero (0), in step 120 the invention identifies the first option as a new option. In step 130, the invention assigns a quantity of one to the first option. At this point, the invention names the first option, in step 170, and subsequently displays the name of the first option to the user. Generally, the first option is named according to contract, optioncode, strike, and callput. For example, a first option may be named December 2004 Crude Oil $38.00 Call Option.

Figure 2:
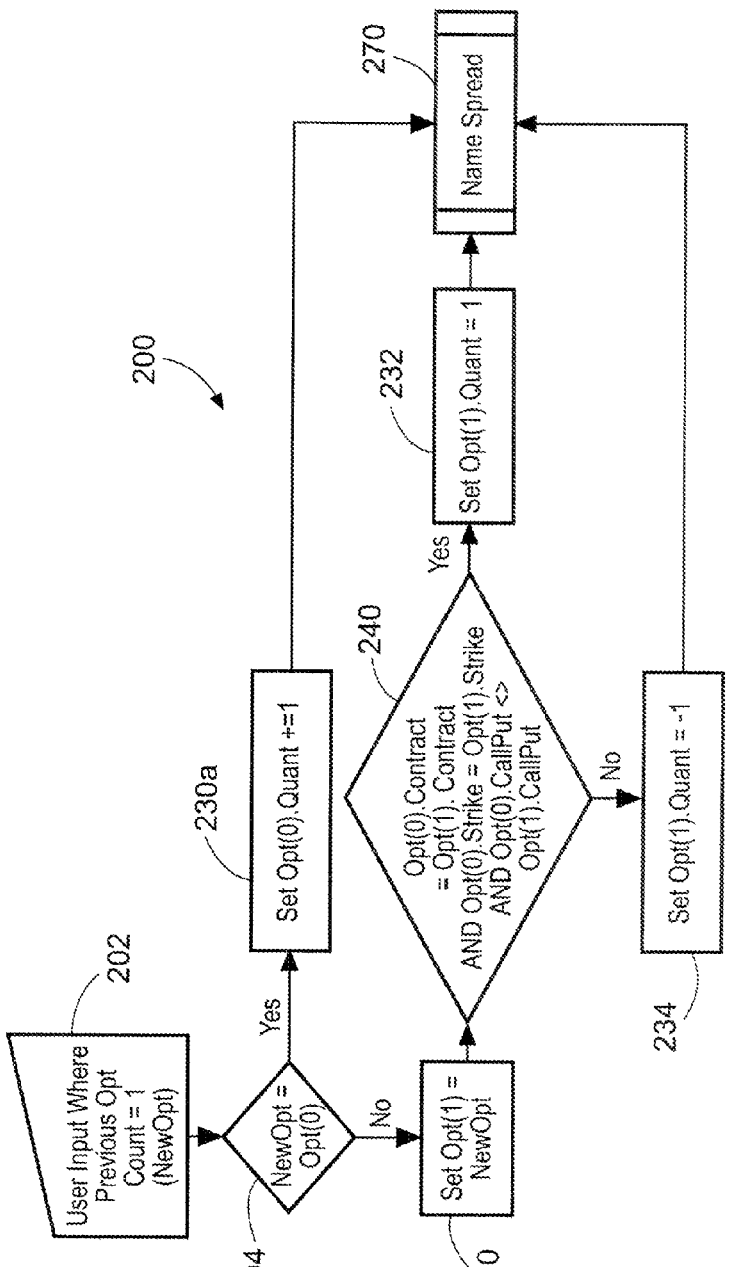
FIG. 2 is a system overview of the invention in accordance with the first and second illustrative embodiments.

FIG. 2 is a system overview of the invention in accordance with the first and second illustrative embodiments. FIG. 2 depicts a two legged spread. In FIG. 2, the user has inputted a sequence of options that includes at least two, but potentially more, options. In step 202, the invention recognizes a leg count of one (1). In step 204, the invention compares the new option with the first option. If the optioncode, contract, strike, and callput of the new option equals the optioncode, contract, strike, and callput of the first option in step 204, the invention adds one (1) to the quantity of the first option in step 230a. In so doing, the quantity of the first leg becomes two (2) in step 230a. The option spread still has just one leg, but that one leg has a quantity of two (2). Otherwise if the new option does not equal the first option in step 204, the invention in step 202 identifies the new option as officially new, at which point, the invention, in step 240, determines if the contracts and strikes of the first option and the new option are equal and if callputs of the first option and the new option are different. If so, in step 232, the invention assigns a quantity of one (1) to the new option. Otherwise, in step 234, the invention assigns a quantity of negative one (-1) to the new option. In step 270, the invention names the spread.

As depicted in FIGS. 1 and 2, the invention names the option spread based upon the existing number of legs in the option spread, the assigned quantity of each option, and, in the case of multiple options, a comparison of the optioncodes, contracts, strikes, and callputs of each option. In FIG. 2, if the new option equals the first option in step 204, the invention assigns a quantity of two (2) to the first option in step 230a and names the spread in step 270. In such case, while the quantity of the first option equals two (2), the leg count of the option spread equals one (1). Therefore, the next input, even though it would be a third input, would start at FIG. 2, because leg count equals one.

Figure 3:
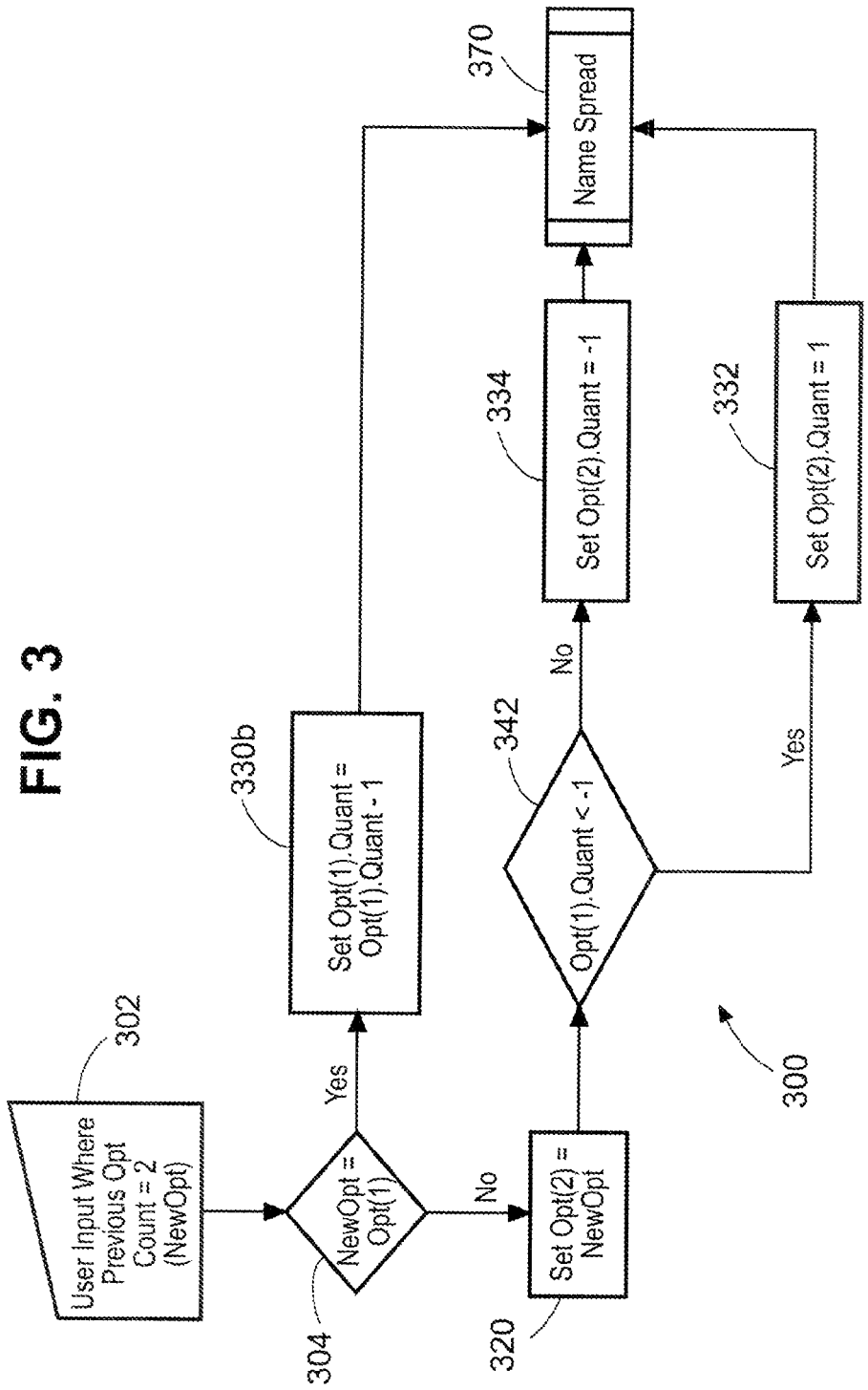
FIG. 3 is a system overview of the invention also in accordance with the first and second illustrative embodiments.

FIG. 3 is a system overview of the invention also in accordance with the first and second illustrative embodiments. FIG. 3 depicts a 3 legged spread. In FIG. 3, the user has entered at least three, and potentially more, options in the sequence of options, which is apparent in step 302. From step 302, it is apparent that the previous option count is two (2). Accordingly, the user has inputted at least three options in the sequence. In step 304, the invention compares the new option with the second option. If the optioncodes, contracts, strikes, and callputs of the new option equal the second option in step 304, the invention subtracts one (1) from the quantity previously assigned to option two in step 330b. In so doing, the invention enables the user to create ratio spreads. For instance, if the user has already entered a 1×2 call spread or, in other words, the quantity of the first leg is positive one (1) and the quantity of the second leg is negative two (-2), then adding an option which is identical to the second leg merely increments the quantity of the second leg by negative one (-1). In so doing, the user created a 1×3 call spread or, in other words, the first leg quantity equals positive one (1) and the second leg quantity equals negative three (-3). If the new option and the second option are unequal, the invention recognizes the new option as new in step 320. Then the invention compares the quantity of the second option in step 342. If the quantity of the second option equals less than negative one (-1), then the invention assigns a quantity of positive one (1) to the new option in step 332. Otherwise, in step 334, the invention assigns a quantity of negative one (-1) to the new option. Finally, the invention determines the type of option spread and names it so in step 370.

Figures 4, 5:
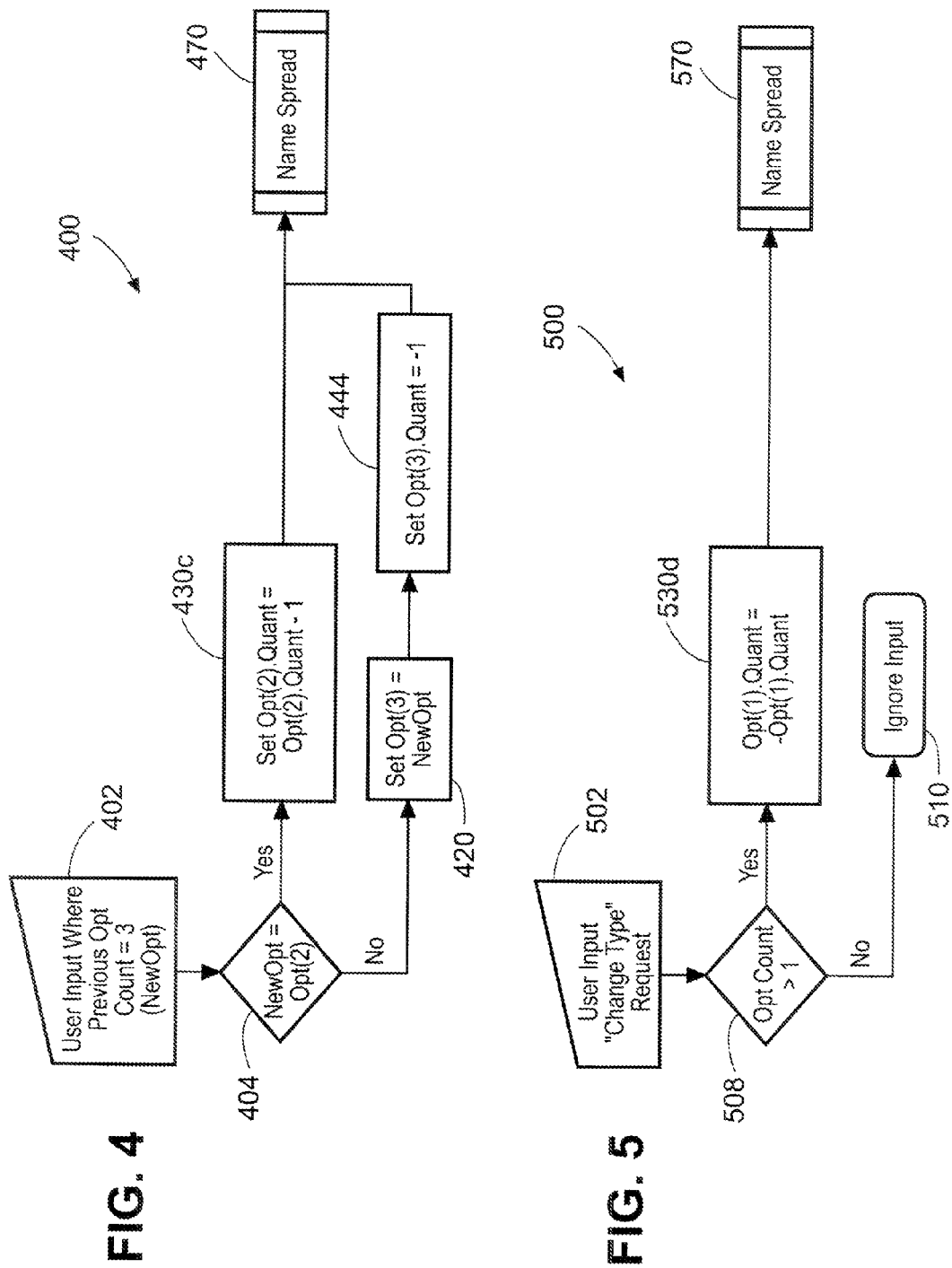
FIG. 4 is a system overview of the invention further in accordance with the first and second illustrative embodiments.
FIG. 5 is a system overview of the "change type" feature of the invention.

FIG. 4 is a system overview of the invention further in accordance with the first and second illustrative embodiments. FIG. 4 depicts a four legged spread. In FIG. 4, the user has inputted at least four, but potentially more options, which is apparent because step 402 indicates three (3) as the previous leg count. In step 404, the invention compares the new option with the third option. If the optioncode, contract, strike, and callput of the new option equals the third option, the invention subtracts one (1) from the quantity previously assigned to the third option and assigns the third option such new value in step 430s. Otherwise, the invention identifies the new option as new in step 420 and assigns the new option a quantity of negative one (−1) in step 444. Finally, the invention determines the type of option spread and names it so in step 470.

FIG. 5 is a system overview of the change type feature of the invention as applied to an option spread with at least two options. As one of ordinary skill in the art would recognize, the change type feature is not limited to two legged spreads, but may be applied to option spreads with any number of legs. With the change type feature, a user instructs the invention to reverse the polarity or, in other words, the sign of the quantity assigned to the second option. In step 502, the invention receives a change type request from the user. In step 508, the invention ensures that the option count is greater than one (1). If so, in step 530d, the invention assigns the second option the same quantity previously assigned to the second option, but with reverse polarity. For instance, if the second option was previously assigned the quantity of negative one (−1) in step 530d, the invention would assign the second option the quantity of positive one (1). The invention then determines a new name for the option spread and names it so in step 570. It should be noted that if the option count was not greater than 1 in step 508, the invention would ignore the input in step 510.

Figure 6:
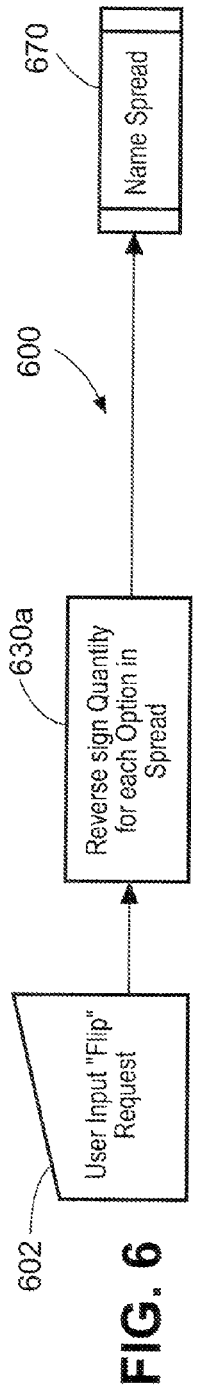
FIG. 6 is a system overview of the "flip request" feature of the invention.

FIG. 6 is a system overview of the flip request feature of the invention. As described with reference to FIG. 5, with the flip request feature, the user can change the polarity or sign, not just of the second option, but of each option in the option spread. In step 602, the invention receives a flip request from the user. In step 630a, the invention reverses the sign of each quantity assigned to each option in the option spread. Finally, the invention determines the new option spread name and names it so in step 670.

Figure 7:
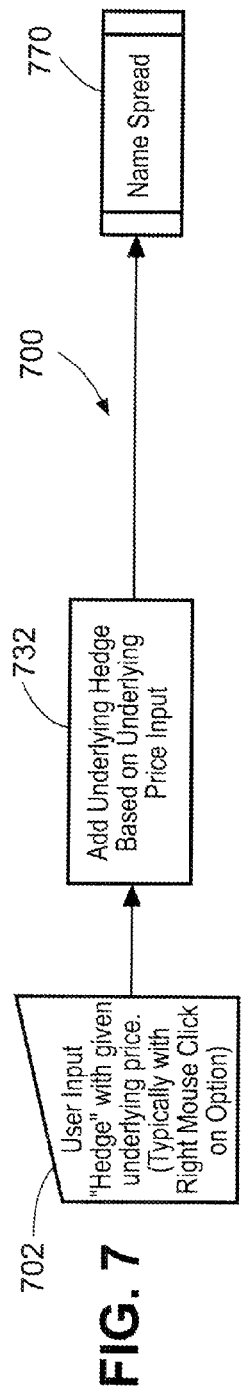
FIG. 7 is a system overview of the "hedge" feature of the invention.

FIG. 7 is a system overview of the "hedge" feature of the invention. Often, outright options and option spreads are traded with an associated underlying hedge in order to reduce the delta risk of the trade and therefore obtain a tighter market to trade on. This feature allows the user to attach the appropriate number of underlying securities to the trade at a user specified price in order to make the trade (or portions of the trade) delta neutral. In step 702, the invention receives a hedge along with an underlying price from the user. In step 732, the invention adds the underlying hedge based upon the underlying price. Once complete, the invention determines the value of the option spread and names it so in step 770.

Figure 8:
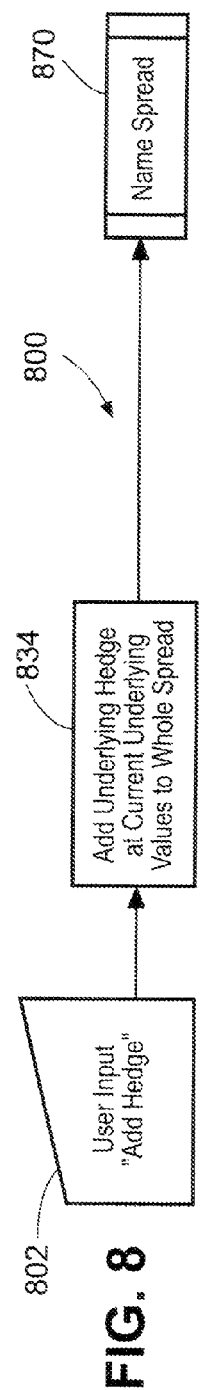
FIG. 8 is a system overview of the "add hedge" feature of the invention.

FIG. 8 is a system overview of the add hedge feature of the invention. This feature is similar to the feature depicted in FIG. 7, but that the hedge is applied to the entire spread at prevailing underlying market values—not at user specified prices as depicted in FIG. 7. In step 802, the invention receives an add hedge request from the user. In step 834, the invention adds the underlying hedge at current values to the whole option spread. Once complete, the invention determines the value of the option spread and names it so in step 870.

It should be noted that the present invention has been described herein with reference to one, two, three, and four legged option spreads, however the present invention can be applied to option spreads with any number of legs.

FIGS. 9-11 are system overviews of the invention as applied to a two legged option spread while FIG. 12 is a system overview of the invention as applied to a three legged spread. FIG. 10 stems from step 996 in FIG. 9. FIG. 11 stems from step 994 in FIG. 9. FIG. 12 stems from step 992 in FIG. 9.

Turning now to FIG. 9, FIG. 9 depicts the steps that the invention takes towards naming the following two legged spreads: straddle (step 951a), ratio vertical put spread (step 952a), vertical put spread (step 953a), calendar put spread (step 954a), calendar vertical put spread (step 955a), ratio calendar put spread (step 956a), and ratio vertical calendar put spread (step 957a). Once it has been determined that the option count equals two (2) in step 902, the invention compares quantity, contract, strike, and callput of the first and second options in step 940. If equal, the invention determines that the type of option spread is a straddle in step 951 and names it so in step 951a. Otherwise, the invention compares the callput of the first option and second options in step 941. If equal, the invention determines if the callput for the first option is a call in step 946. If so, the invention follows the steps detailed in FIG. 10 (step 996). If the callputs are not equal in step 941, the invention follows the steps detailed in FIG. 11 (step 994). If the first option callput does not equal a call in step 946, the invention compares the contracts of the first and second options in step 943. If equal, in step 943, then the invention compares the quantities of the first and second options in step 944a. If the quantity of the first option equals the quantity of the second option, but with reverse polarity, then in step 953 the invention determines that the option spread is a vertical put spread and names it so in step 953a. Otherwise, the invention determines that the option spread is a ratio vertical put spread in step 952 and names it so in step 952a.

If, in step 943, the contract of the first option does not equal the contract of the second option, then the invention compares the quantities of the first option and the second option in step 944a. If the quantity of the first option equals the quantity of the second option, but with reverse polarity, then the invention compares the strikes of the first and second options in step 945. If equal, the invention determines that the option spread is a calendar put spread in step 954 and names it so in step 954a. If unequal, the invention determines that the option spread is a calendar vertical put spread in step 955 and names it so in step 955a.

If the quantity of the first option does not equal the quantity of the second option, but with reverse polarity in step 944a, the invention compares the strikes of the first and second option in step 945. If equal, the invention determines that the option spread is a ratio calendar put spread in step 956 and names it so in step 956a. If unequal, the invention determines that the option spread is a ratio vertical calendar put spread in step 957 and names it so in step 957a.

With reference to FIG. 10, in step 1043, the invention compares the contracts of the first and second options. If equal, the invention compares the quantities of the first and second options in step 1044a. If the quantity of the first option equals the quantity of the second option, but with reverse polarity, in step 1044a, the invention determines that the option spread is a vertical call spread in step 1059, and names it so in step 1059a. If quantity of the first option does not equal the quantity of the second option, but with reverse polarity, the invention determines that the option spread is a ratio vertical call spread in step 1058, and names it so in step 1058a.

If, in step 1043, the invention compares the contracts of the first and second options and the contracts are not equal, the invention compares the quantities of the first and second options in step 1044a. If the quantities of the first and second options are equal, but with reverse polarity, the invention compares strikes of the first and second options in step 1045. If equal, the invention determines that the option spread is a calendar call spread in step 1061 and names it so in step 1061a. If unequal, the invention determines that the option spread is a calendar vertical call spread in step 1062, and names it so in step 1062a.

If, in step 1044a, the quantities of the first and second option are not equal with reverse polarity, the invention compares the strikes of the first and second options in step 1045. If equal, the invention determines that the option spread is a ratio calendar call spread in step 1063, and names it so in step 1063a. If unequal, the invention determines that the option spread is a ratio vertical calendar call spread in step 1064, and names it so in step 1064a.

With continued reference to FIG. 11, the invention compares the contracts for the first and second options in step 1143. If unequal, the invention compares the quantities of the first and second option in step 1144a1. If both the first and second options have a quantity of positive one (1), the invention determines that the option spread is a calendar strangle in step 1167, and names it so in step 1167a. If the quantities of the first and second options do not both equal positive one (1), the invention compares the quantities of the first and second options in step 1144a. If the quantity of the first option equals the quantity of the second option, but with reverse polarity, the invention determines that the option spread is a calendar fence/collar in step 1165, and names it so in step 1165a. If not, the invention determines that the option spread is a calendar ratio fence/collar, in step 1166, and names it so in step 1166a.

If, in step 1143, the invention compares the contracts of the first and second options and determines that the contracts are equal, the invention then compares the strikes of the first and second options in step 1145. If the strikes of the first and second options are not equal, the invention compares the quantities of the first and second options in step 1144a1. If both quantities equal positive one (1), the invention determines that the option spread is a strangle in step 1171, and names it so in step 1171a. If both quantities do not equal positive one (1), the invention compares the polarities of the first and second options in step 1144a. If the quantity of the first option equals the reverse polarity of the quantity of the second option, the invention determines that the option spread is a fence/collar in step 1168 and names it so in step 1168a. Otherwise, the invention determines that the option spread is a ratio fence/collar in step 1169, and names it so in step 1169a.

If the strikes of the first and second options are equal in step 1145, the invention compares the quantities of the first and second options in step 1144a. If the quantities are equal but with a reverse sign polarity, the invention determines if offsetting futures exist in step 1147. If so, the invention determines that the option spread is a conversion in step 1173 and names it so in step 1173a. If the quantities of the first and second options are not equal with reverse polarity, the invention determines that the option spread is another ratio synthetic futures in step 1172 and names it so in step 1172a. If offsetting futures do not exist in step 1147, the invention determines if the callput of the first option is a call in step 1146. If so, the invention determines that the option spread is a synthetic long futures in step 1174 and names it so in step 1174a. If not, the invention determines that the option spread is a synthetic short futures in step 1175, and names it so in step 1175a.

FIG. 12 is a system overview of the invention for the three legged option spread in accordance with the first and second illustrative embodiments. As discussed above, FIG. 12 stems from FIG. 9. If the option count does not equal 2, in step 902 in FIG. 9, then the invention determines if the option count is three (3). If the option count does not equal three (3), the invention does no further computation, assuming a program error. If the option count equals three (3), the invention compares the contracts of the first, second, and third options in step 1243a. If the contracts of the first and second options do not equal or if the contracts of the second and third options do not equal, the invention does no further computation, assuming a program error. Alternatively, if the contracts are equal, the invention compares the callputs of the first and second options as well as the callputs of the second and third options in step 1241a1.

In step 1241a, the invention compares the callputs of the first, second, and third options. If equal, the invention compares the quantities of the first, second, and third options in step 1244a2. If the quantity of the first option is greater than zero (0) and the quantities of both the second and third options are less than zero (0), then the invention compares quantities of the first, second, and third option in step 1244a3i. If the quantities of the first and third options equal positive one (1) and the quantity of the second option equals negative one (−1), the invention checks the callput of one of the first, second, and third options in step 1246. If the callput equals a call, then the invention determines that the option spread is a call tree in step 1276. Otherwise, the invention determines that the option spread is a put tree in step 1277. Alternatively, if, in step 1244a3i, the quantities of the first option and third options do not equal positive one (1) and the quantity of the second option does not equal negative one (−1), the invention checks the callput of at least one of the first, second, and third options in step 1246. If the callput equals a call in step 1246, the invention determines that the option spread is a call tree in step 1278. Otherwise, the invention determines that the option spread is a put tree in step 1279.

If, in step 1244a2, the quantity of the first option is not greater than zero (0) or the quantities of both the second and third options are not less than zero (0), the invention compares quantities in step 1244a3ii. If the quantities of the first and third option are both greater than zero (0) and the quantity of the second option is less than zero (0), then the invention further compares quantities in step 1244a4. If the first option equals positive one (1), the second option equals negative two (−2), and the third option equals negative one (−1), then the invention compares callput in step 1246. If the callput equals a call, the invention determines that the option spread is a call butterfly in step 1281. Otherwise, the invention determines that the option spread is a put butterfly in step 1282. If, in step 1244a4, the first option does not equal positive one (1) or the second option does not equal negative two (−2), or the third option does not equal negative one (−1), the invention compares callput in step 1246. If the callput equals a call, the invention determines that the option spread is a call butterfly in step 1283. Otherwise, the invention determines that the option spread is a put butterfly in step 1284. It should be mentioned that if the quantities of the first and third option are not greater than zero (0) or alternatively the quantity of the second option is not less than zero (0), the invention determines that the option spread is another three legged spread in step 1286.

If in step 1241a1, the callputs of the first and second options are not equal or the callputs of the second and third options not equal, the invention compares if the callput of the first option equals the callput of the second option and if the callput of the second option is different from the callput of the third option in step 1241*b*. If so, the invention determines that the option spread is a 3-way option spread in step 1285. Otherwise, the invention determines that the option spread is another three legged spread in step 1286.

Figure 13:
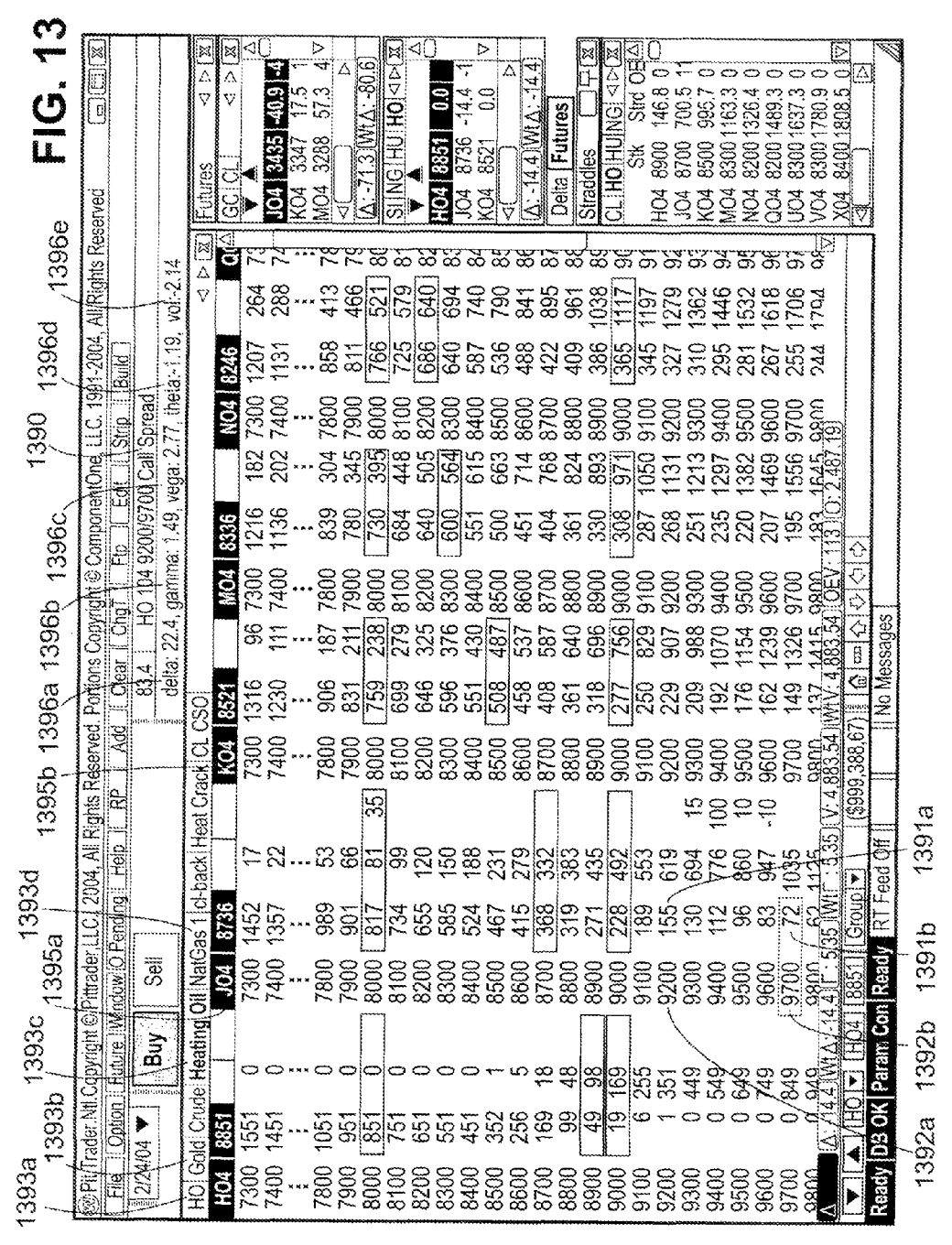

FIG. 13 is a screen print in accordance with the first and second illustrative embodiments. As discussed previously, the invention presents a set of grids on the display device. The heating oil grid 1396*c*, which represents the heating oil optioncode, is depicted in FIG. 13. The user has made two selections 1392*a*, 1392*b* chosen from the set of selectable options. Each selection comprises an optioncode, a contract, a strike, and a callput. For the first selection 1391*a*, the optioncode is heating oil 1393*c*, the contract is April 2004 (J04) 1395*a*, the strike is $155, and the callput is a call option. The first column in the contract represents a call option, while the second column in the contracts represents a put option. For the second selection 1391*b*, the optioncode is heating oil 1393*c*, the contract is April 2004 (J04) 1395*a*, the strike is $72, and the callput is a call option. As shown in FIG. 13, the invention has determined and named the option spread 1390. The option spread has been named HO J04 9200/9700 Call Spread. In addition, the invention has calculated a price for the option spread, namely $83.4. Finally, the invention has calculated the delta, gamma, vega, theta, and implied volatility for the option spread, namely 22.4, 1.49, 2.77, −1.19, and −2.14 respectively.

While in the screen print of FIG. 13, only two options have been chosen, the invention can be applied to any number of inputted options. In addition, while in FIG. 13, both options have been chosen from the heating oil optioncode, the user may select options from the various optioncodes. FIG. 13 depicts the optioncodes for HU 1393*a*, gold 1393*b*, crude oil, heating oil 1393*c*, natural gas 1393*d*, cl-back, heat crack, CL CSO1. In addition, while in FIG. 13, both options have been chosen from the same contract, namely April 2004, the user may select options from various contracts. FIG. 13 depicts contracts March 2004 (H04), April 2004 (J04) 1395*a*, May 2004 (K04) 1395*b*, June 2004 (M04), July 2004 (N04), and August 2004 (Q04). While in FIG. 13 the user selected two options at the different strikes, the user could have selection two options at the same strike. While in the FIG. 13 the user selected two call option callputs, the user could have selected a call option and a put option, or any other combination of call and put options.

It should be noted that while the invention was described with reference to two and three legged legs, the invention is equally applicable to four legged option spreads and other types of trading options.

The following are generally accepted standard option spread names and their definitions, to which the invention applies. First, the two legged spreads will be described.

"Call Option Spread"—Buy one call option, sell a second call option in the same contract with a higher strike. (Also known as "Vertical Call Spread") If the calls are in different contracts, then it is known as a "Calendar Call Spread".

"Put Option Spread"—Same as Call Option Spread, except with the put options in descending strikes.

"Ratio Call Spread"—Buy one call option, sell more than one of a second call option (typically in the same contract) with a (typically) higher strike price. Most common ratio would be 1×2. But can be almost any ratio (1×5, 2×3, 1×1.75 etc.)

"Ratio Put Spread"—Same as call option spread, except with put options.

"Straddle"—Buy a call option and put option in the same contract with the same strike.

"Strangle"—Buy a call option and put option in the same contract with different strikes. If the call option strike is less than the put option strike, then the spread is referred to as a "Guts Strangle". If the call option and put option are in different months then it is referred to as a "Calendar Strangle" or "Guts Calendar Strangle".

"Fence"—Also referred to as a "Risk Reversal". Purchase a Call (Put) and sell a Put (Call).

"Ratio Fence"—Same as Fence except that one leg has more than one option.

The following are generally accepted standard three legged option spread names and their definitions, to which the invention applies.

"Call Butterfly"—Buy one call option, sell two call options at a higher strike, buy one call option at a still higher strike. If the call options are in different months then it is referred to as a "Calendar Call Butterfly."

"Put Butterfly"—Same as call butterfly except with put options and with descending strikes.

"Call Tree"—Buy one call option, sell a second call option at a higher strike, sell a third call option at a still higher strike.

"Put Tree"—Same as Call Tree except with put options and descending strikes.

"3-way"—Buy a Call Option Spread and sell a put option, or Buy a Put Option Spread and sell a call option.

"Ratio 3-way"—Same as 3-way except that instead of a Call Spread (Put Spread), there is a Ratio Call Spread (Ratio Put Spread).

The following are generally accepted standard four legged option spread names and their definitions, to which the invention applies.

"Iron Butterfly"—Buy a straddle and sell a strangle within the same contract.

"Call Condor"—Buy one call option, sell a second call option at a higher strike, sell a third call option at a still higher strike, buy a fourth call option at a yet higher strike.

"Put Condor"—Same as Call Condor except with put options and with descending strikes.

"Straddle Spread"—Buy a Straddle in one contract and sell a Straddle in a different contract ("Calendar Straddle Spread") or different strike ("Vertical Straddle Spread").

The following is a generally accepted type of option spread and its definition, to which the invention applies.

"Strips"—A strip consists of any combination of options or spreads that are purchased or sold simultaneously across a number of contracts. For example, a Crude Oil Calendar Year 2005 $25.00 Put Strip would be the simultaneous purchase of each $25.00 put option for each contract month in 2005 (12 contracts).

The following are some alternative generally accepted trading names and their definitions, to which the invention applies.

"Hedged Trades"—Note that any of these trades can be made in combination with their underlying futures in a ratio that makes the trade initially have no bias towards the underlying futures movements.

"Synthetic Call"—Purchase one put option and purchase like quantity of underlying.

"Synthetic Put"—Purchase one call option and sell like quantity of underlying.

"Synthetic long (short) underlying"—Purchase one call (put) and sell one put (call).

"Conversions/Reversals"—Purchase synthetic long underlying and sell like quantity of underlying.

The following are standard pricing spreads and their definitions, to which the invention applies.

"Standard Spreads"—Multiply the price of each leg times the quantity of each leg and add all legs together.

"Strips"—Divide into contracts and then price each option spread within the contract. Then add each option spread value for each contract. Then divide by the total contracts in the strip to get the average price.

The above method was implemented on a standard PC, though the software is ideal for use on trading floors with a small, lightweight Tablet PC that allow the user to define option spreads simply by pointing a pen or stylus on to the screen to quickly build and evaluate complex option spreads. The system, as it currently operates, runs over any standard TCP/IP connection including the wireless networks that have been implemented on the various trading floors. Real-time market data is fed into the application which allows for the recalculation of option values instantaneously so that the user can track his position, risk, profit and loss, option and other derivative values.

Thus, while there have been shown, described, and pointed out fundamental novel features of the invention as applied to a preferred embodiment, it will be understood that various omissions, substitutions, and changes in the form and details of the devices illustrated, and in their operation, may be made by those skilled in the art without departing from the spirit and scope of the invention. For example, it is expressly intended that all combinations of those elements steps which perform substantially the same, function in substantially the same way, to achieve the same results are within the scope of the invention. Substitutions of elements from one described embodiment to another are also fully intended and contemplated. It is also to be understood that the drawings are not necessarily drawn to scale, but that they are merely conceptual in nature. It is the intention, therefore, to be limited only as indicated by the scope of the claims appended hereto.

What is claimed is:

1. A method for determining a type of an option spread based upon options received from an input device, the method comprising the steps of
   (a) determining, by a computer, a first previous option count;
   (b) receiving a first option from an input device, the first option comprising an optioncode, a contract, a strike, and a callput;
   (c) assigning a quantity for the first option;
   (d) determining, by said computer, a second previous option count;
   (e) receiving a second option from an input device the second option comprising an optioncode, a contract, a strike, and a callput;
   (f) comparing, by said computer, the second option to the first option;
   (g) assigning a quantity for at least one of the first option and the second option based upon the comparison of the second option to the first option; and
   (h) determining, by said computer, a type of option spread based upon at least one of the first and second option counts, the comparison of the second option to the first option, and the assigned quantities of the first and second options.

2. The method according to claim 1, further comprising the step of
   (i) calculating, by said computer, a current valuation for the option spread.

3. The method according to claim 2, further comprising the step of
   (j) naming the option spread.

4. The method according to claim 3, further comprising the step of
   (k) calculating, by said computer, at least one of a delta, gamma, vega, theta, and an implied volatility of at least one of the first option, the second option, and the option spread;
   wherein the delta indicates price sensitivity to changes in price of an underlying asset for the option;
   wherein the gamma indicates delta sensitivity to changes in price of the underlying asset for the option;
   wherein the vega indicates price sensitivity to changes in expected volatility;
   wherein the theta indicates price sensitivity to changes in time until expiration of the option; and
   wherein the implied volatility indicates a particular volatility derived from market price.

5. The method according to claim 4, wherein the delta, gamma, vega, theta, and implied volatility are calculated as at least one of an aggregate value and a subtotal by underlying asset.

6. The method according to claim 4, further comprising the step of
   (1) sending at least one of the quantity, current valuation, name, delta, gamma, vega, theta, and implied volatility to a display device.

7. The method according to claim 1, further comprising the step of
   (i) sending the optioncode, contract, strike, and callput of the first option to a display device.

8. The method according to claim 7 further comprising the step of
   (j) displaying at least one of the quantity, name, current valuation, delta, gamma, vega, theta, and implied volatility on the display device.

9. The method according to claim 7 further comprising the step of:
   (j) displaying the optioncode, contract, strike, and callput of the first option on the display device.

10. The method according to claim 1 wherein the input device is at least one of a mouse, a keyboard, a light emitting diode device, a touch screen, and a tracking ball.

11. The method according to claim 1 wherein the option spread is at least one selected from the group consisting of
    a straddle, a ratio vertical put spread, a vertical put spread, a calendar put spread, a calendar vertical put spread, a ratio calendar put spread, a ratio vertical calendar put spread, a calendar fence/collar, a calendar ratio fence/collar, a calendar strangle, a fence/collar, a ratio fence/collar, a strangle, a conversion, a synthetic long futures, a synthetic short futures, a ratio vertical call spread, a vertical call spread, a calendar call spread, a calendar vertical call spread, a ratio calendar call spread, and a ratio vertical calendar put spread.

12. A method for determining a type of option spread based upon a sequence of options received from an input device comprising the steps of
    (a) determining, by a computer, a previous option count;
    (b) receiving a sequence of options from an input device, each option comprising an optioncode, a contract, a strike, and a callput;
    (c) comparing, by said computer, the optioncode, contract, strike, and callput of each option with the optioncode, contract, strike, and callput of each other option in the sequence;
    (d) assigning a predetermined quantity to the option first received in the sequence of options;

(e) assigning a quantity for each option other than the option first received based upon the comparison of each option with respect to each other option and the quantity of each option with respect to each other option; and (f) determining, by said computer, a type of option spread based upon the comparison of each option with each other option and the assigned quantity of each option.

13. The method according to claim 12 further comprising the step of
(g) calculating, by said computer, a current valuation of the option spread.

14. The method according to claim 13 further comprising the step of
(h) naming the option spread.

15. The method according to claim 14 further comprising the step of
(i) calculating, by said computer, at least one of a delta, gamma, vega, theta, and an implied volatility of at least one of said option in the sequence of options and in the option spread;
wherein the delta indicates price sensitivity to changes in price of the underlying asset for the option;
wherein the gamma indicates delta sensitivity to changes in price of an underlying asset for the option;
wherein the vega indicates price sensitivity to changes in expected volatility;
wherein the theta indicates price sensitivity to changes in time until expiration of the option; and,
wherein the implied volatility indicates a particular volatility derived from market price.

16. The method according to claim 15 further comprising the step of
(j) sending at least one of the quantity, current valuation, name, delta, gamma, vega, theta, and implied volatility to a display device.

17. The method as in claim 16, further comprising the step of
(k) displaying at least one of the quantity, current valuation, name, delta, gamma, vega, theta, and implied volatility on the display device.

18. The method according to claim 12, wherein the input device is at least one selected from the group consisting of a mouse, keyboard, a light emitting diode device, a touch screen, and a tracking ball.

19. The method according to claim 12 wherein the option spread is at least one selected from the group consisting of a straddle, a ratio vertical put spread, a vertical put spread, a calendar put spread, a calendar vertical put spread, a ratio calendar put spread, a ratio vertical calendar put spread, a calendar fence/collar, a calendar ratio fence/collar, a calendar strangle, a fence/collar, a ratio fence/collar, a strangle, a conversion, a synthetic long futures, a synthetic short futures, a ratio vertical call spread, a vertical call spread, a calendar call spread, a calendar vertical call spread, a ratio calendar call spread, a ratio vertical calendar put spread, a 3-way call spread versus a put, a 3-way put spread versus a call, a call tree, a put tree, a butterfly, an iron butterfly, and a straddle spread.

20. A method for determining a type of option spread based upon a sequence of user selections received from an input device, the method comprising the steps of
displaying a set of grids on a display device, each grid representing an optioncode and comprising a set of selectable options;
receiving a sequence of user selections chosen from the set of selectable options, each user selection comprising an optioncode, a contract, a strike, and a callput;
comparing, by a computer, the optioncode, contract, strike, and callput of each user selection with each other user selection in the sequence;
assigning a quantity for each user selection in the sequence of user selections received based upon the comparison of each user selection with each other user selection and the assigned quantity of each user selection; and
determining, by said computer, a type of option spread based upon a previous option count, the comparison of each user selection with each other user selection, and the assigned quantity of each user selection.

21. The method according to claim 20, wherein each grid comprises an x-axis and a y-axis, and wherein the x-axis comprises a set of contract and callput selections, and the y-axis comprises a set of strike selections, or vice versa.

22. The method according to claim 20, wherein the comparing step occurs prior to at least one of a predefined time out and a receipt of a clear instruction.

23. A method for determining a type of option spread based upon a sequence of user selections received from an input device, the method comprising the steps of
displaying a set of grids on a display device, each grid representing a single optioncode and comprising a set of selectable boxes;
receiving a selection of a sequence of said selectable boxes, each selection in the sequence comprising the optioncode, a contract, a strike, and a callput; and
determining, by a computer, for the selected sequence, a type of option spread, an option spread name, an option spread valuation, and a quantity for the option spread.

24. The method according to claim 23, further comprising the step of assigning a quantity, inclusive of at least one of a positive and negative sign, for each user selection in the sequence.

25. The method according to claim 24, further comprising the step of calculating, by said computer, at least one of a delta, gamma, vega, theta, and implied volatility of at least one of said selection in the sequence and the option spread;
wherein the delta indicates price sensitivity to changes in price of an underlying asset for the option;
wherein the gamma indicates delta sensitivity to changes in price of an underlying asset for the option;
wherein the vega indicates price sensitivity to changes in expected volatility;
wherein the theta indicates price sensitivity to changes in time until expiration of the option; and,
wherein the implied volatility indicates a particular volatility derived from market price.

26. The method according to claim 23, wherein each grid comprises an x-axis and a y-axis, the x-axis comprises a set of contract and the callput selections, and the y-axis comprises a set of strike selections, or vice versa.

27. The method according to claim 23, further comprising the step of
saving the provided option spread to a watch list for an update on the current valuation of the option spread.

28. The method according to claim 23, further comprising the steps of instructing a sign change of the provided option spread that reverses the sign of the provided quantity for at least one user selection in the sequence; and,
receiving, based upon the sign change instruction, a type of option spread, a corresponding option spread name and option spread valuation.

29. The method according to claim 25, further comprising the step of instructing a sign change of the provided option spread that reverses the sign of the provided quantity for at least one user selection in the sequence; and, receiving a recalculated at least one of a delta, gamma, vega, theta, and implied volatility.

30. The method according to claim 25, further comprising the steps of instructing a sign change of a second selection in the sequence that reverses the sign of the provided quantity for each user selection in the sequence;

recalculating, by said computer, at least one of a delta, gamma, vega, theta, and implied volatility, and, receiving the at least one of a delta, gamma, vega, theta, and implied volatility from the recalculating step.

31. The method according to claim 23, further comprising the step of adding a hedge with a user specified valuation; and receiving a recalculated option spread price in accordance with the added hedge.

32. The method according to claim 23, further comprising the step of adding a hedge with a market specified valuation; and receiving a recalculated option spread price in accordance with the added hedge.

33. A computer readable medium containing computer readable instructions that when executed by a computer determine a type of an option spread based upon options received from an input device, the computer readable instructions comprising:

(a) instructions for determining a first previous option count;

(b) instructions for receiving from an input device a first option, the first option comprising an optioncode, a contract, a strike, and a callput;

(c) instructions for assigning a quantity for the first option;

(d) instructions for determining a second previous option count;

(e) instructions for receiving from an input device a second option, the second option comprising an optioncode, a contract, a strike, and a callput;

(f) instructions for comparing the second option to the first option;

(g) instructions for assigning a quantity for at least one of the first option and the second option based upon the comparison of the second option to the first option; and (h) instructions for determining a type of option spread based upon at least one of the first and second option counts, the comparison of the second option to the first option, and the assigned quantities of the first and second options.

34. The computer readable medium according to claim 33, wherein the computer readable instructions further comprise:

(i) instructions for calculating a current valuation for the option spread.

35. The computer readable medium according to claim 34, wherein the computer readable instructions further comprise:

(j) instructions for naming the option spread.

36. The computer readable medium according to claim 35, wherein the computer readable instructions further comprises (k) instructions for calculating at least one of a delta, gamma, vega, theta, and an implied volatility of at least one of the first option, the second option, and the option spread;

wherein the delta indicates price sensitivity to changes in price of an underlying asset for the option;

wherein the gamma indicates delta sensitivity to changes in price of the underlying asset for the option;

wherein the vega indicates price sensitivity to changes in expected volatility;

wherein the theta indicates price sensitivity to changes in time until expiration of the option; and, wherein the implied volatility indicates a particular volatility derived from market price.

37. The computer readable medium according to claim 36, wherein the delta, gamma, vega, theta, and implied volatility are calculated as at least one of an aggregate value and a subtotal by underlying asset.

38. The computer readable medium according to claim 35, wherein the computer readable instructions further comprise:

(k) instructions for sending at least one of the quantity, current valuation, name, delta, gamma, vega, theta, and implied volatility to a display device.

39. The computer readable medium according to claim 33, wherein the computer readable instructions further comprise instructions for sending the optioncode, contract, strike, and callput of the first option to a display device.

40. The computer readable medium according to claim 39, wherein the computer readable instructions further comprise:

(i) instructions for displaying at least one of the quantity, name, current valuation, delta, gamma, vega, theta, and implied volatility on the display device.

41. The computer readable medium according to claim 39, wherein the computer readable instructions further comprise:

instructions for displaying the optioncode, contract, strike, and callput of the first option on the display device.

42. The computer readable medium according to claim 33, wherein the input device is at least one selected from the group consisting of a mouse, a keyboard, a light emitting diode device, a touch screen, and a tracking ball.

43. The computer readable medium according to claim 33, wherein the option spread is at least one selected from the group consisting of a straddle, a ratio vertical put spread, a vertical put spread, a calendar put spread, a calendar vertical put spread, a ratio calendar put spread, a ratio vertical calendar put spread, a calendar fence/collar, a calendar ratio fence/collar, a calendar strangle, a fence/collar, a ratio fence/collar, a strangle, a conversion, a synthetic long futures, a synthetic short futures, a ratio vertical call spread, a vertical call spread, a calendar call spread, a calendar vertical call spread, a ratio calendar call spread, and a ratio vertical calendar put spread.

44. A computer readable medium containing computer readable instructions that when executed by a computer determine a type of an option spread based upon options received from an input device, the computer readable instructions comprising (a) instructions for determining a previous option count;

(b) instructions for receiving a sequence of options from an input device, each option comprising an optioncode, a contract, a strike, and a callput;

(c) instructions for comparing the optioncode, contract, strike, and callput of each option with the optioncode, contract, strike, and callput of each other option in the sequence;

(e) instructions for assigning a quantity for at least one option in the sequence of options based upon the comparison of each option with respect to each other option and the quantity of each option with respect to each other option; and (f) instructions for determining a type of option spread based upon the previous option count, comparison of each option with each other option and the assigned quantity of each option.

45. The computer readable medium according to claim 44, wherein the computer readable instructions comprise:

(f) instructions for calculating a current valuation of the option spread.

46. The computer readable medium according to claim 45, wherein the computer readable instructions further comprise:
(g) instructions for naming the option spread.

47. The computer readable medium according to claim 46, wherein the computer readable instructions further comprise:
(h) instructions for calculating at least one of a delta, gamma, vega, theta, and an implied volatility of at least one of said option in the sequence of options and in the option spread;
wherein the delta indicates price sensitivity to changes in price of the underlying asset for the option;
wherein the gamma indicates delta sensitivity to changes in price of an underlying asset for the option;
wherein the vega indicates price sensitivity to changes in expected volatility;
wherein the theta indicates price sensitivity to changes in time until expiration of the option; and,
wherein the implied volatility indicates a particular volatility derived from market price.

48. The computer readable medium according to claim 47, wherein the computer readable instructions further comprise:
(i) instructions for sending at least one of the quantity, valuation, name, delta, gamma, vega, theta, and implied volatility to a display device.

49. The computer readable medium according to claim 48, wherein the computer readable instructions further comprise:
(j) instructions for displaying at least one of the quantity, valuation, name, delta, gamma, vega, theta, and implied volatility on the display device.

50. The computer readable medium according to claim 44, wherein the input device from which said computer readable instructions receive a sequence of options is at least one selected from the group consisting of a mouse, keyboard, a light emitting diode device, a touch screen, and a tracking ball.

51. The computer readable medium according to claim 50, wherein the option spread is at least one selected from the group consisting of
a straddle, a ratio vertical put spread, a vertical put spread, a calendar put spread, a calendar vertical put spread, a ratio calendar put spread, a ratio vertical calendar put spread, a calendar fence/collar, a calendar ratio fence/collar, a calendar strangle, a fence/collar, a ratio fence/collar, a strangle, a conversion, a synthetic long futures, a synthetic short futures, a ratio vertical call spread, a vertical call spread, a calendar call spread, a calendar vertical call spread, a ratio calendar call spread, a ratio vertical calendar put spread, a 3-way call spread versus a put, a 3-way put spread versus a call, a call tree, a put tree, a butterfly, an iron butterfly, and a straddle spread.

52. A computer readable medium containing computer readable instructions that when executed by a computer determine a type of option spread based upon a sequence of user selections received from an input device, the computer readable instructions comprising:
instructions for displaying a set of grids on a display device, each grid representing an optioncode and comprising a set of selectable options;
instructions for receiving a sequence of user selections chosen from the set of selectable options, each user selection comprising an optioncode, a contract, a strike, and a callput;
instructions for comparing the optioncode, contract, strike, and callput of each user selection with each other user selection in the sequence;
instructions for assigning a quantity for each user selection in the sequence of user selections based upon the comparison of each user selection with each other user selection and the assigned quantity of each user selection; and
instructions for determining a type of option spread based upon a previous option count, the comparison of each user selection with each other user selection, and the assigned quantity of each user selection.

53. The computer readable medium according to claim 52, wherein each grid comprises an x-axis and a y-axis, and wherein the x-axis comprises a set of contract and callput selections, and the y-axis comprises a set of strike selections, or vice versa.

54. The computer readable medium according to claim 52, wherein the comparing step occurs prior to at least one of a predefined time out and a receipt of a clear instruction.

55. A computer readable medium containing computer readable instructions that when executed by a computer determine a type of option spread based upon a sequence of user selections received from an input device, the computer readable instructions comprising instructions for displaying a set of grids on a display device, each grid representing a single optioncode and comprising a set of selectable boxes;
instructions for receiving a selection of a sequence of said selectable boxes, each selection in the sequence comprising the optioncode, a contract, a strike, and a callput; and
instructions for determining, for the selected sequence, a type of option spread, an option spread name, an option spread valuation, and a quantity for the option spread.

56. The computer readable medium according to claim 55, further comprising computer readable instructions for assigning a quantity, inclusive of at least one of a positive and negative sign, for each user selection in the sequence.

57. The computer readable medium according to claim 56, further comprising
computer readable instructions for calculating at least one of a delta, gamma, vega, theta, and implied volatility of at least one of said selection in the sequence and the option spread;
wherein the delta indicates price sensitivity to changes in price of an underlying asset for the option;
wherein the gamma indicates delta sensitivity to changes in price of an underlying asset for the option;
wherein the vega indicates price sensitivity to changes in expected volatility;
wherein the theta indicates price sensitivity to changes in time until expiration of the option; and,
wherein the implied volatility indicates a particular volatility derived from market price.

58. The computer readable medium according to claim 55, wherein each grid comprises an x-axis and a y-axis, and wherein the x-axis comprises a set of contract and the callput selections, and the y-axis comprises a set of strike selections, or vice versa.

59. The computer readable medium according to claim 55, further comprising
computer readable instructions for saving the provided option spread to a watch list for an update on the valuation of the option spread.

60. The computer readable medium according to claim 55, further comprising
computer readable instructions for instructing a sign change of the provided option spread that reverses the sign of the provided quantity for at least one user selection in the sequence; and, computer readable instructions for receiving, based upon the sign change instruction, a type of option spread, a corresponding option spread name and option spread valuation.

61. The computer readable medium according to claim 57, further comprising computer readable instructions for instructing a sign change of the provided option spread that reverses the sign of the -provided quantity for at least one user selection in the sequence; and, computer readable instructions for receiving a recalculated at least one of a delta, gamma, vega, theta, and implied volatility.

62. The computer readable medium according to claim 57, further comprising computer readable instructions for instructing a sign change of a second selection in the sequence that reverses the sign of the provided quantity for each user selection in the sequence;

computer readable instructions for recalculating at least one of a delta, gamma, vega, theta, and implied volatility, and computer readable instructions for receiving the at least one of a delta, gamma, vega, theta, and implied volatility from the recalculating step.

63. The computer readable medium according to claim 55, further comprising computer readable instructions for adding a hedge with a user specified valuation; and receiving a recalculated option spread price in accordance with the added hedge.

64. The computer readable medium according to claim 55, further comprising computer readable instructions for adding a hedge with a market specified valuation; and computer readable instructions for receiving a recalculated option spread price in accordance with the added hedge.

65. A computer system for determining a type of option spread, the computer system comprising a processor, and a computer readable medium according to any one of claim 33, 44, 52, or 55, wherein said computer readable medium stores computer readable instructions, wherein the processor is configured to execute said computer readable instructions stored on said computer readable medium.

* * * * *